(12) United States Patent
Nero, Jr. et al.

(10) Patent No.: US 10,084,227 B2
(45) Date of Patent: *Sep. 25, 2018

(54) ANTENNA COUPLER MECHANISM

(71) Applicant: Stryker Combo L.L.C., Bingham Farms, MI (US)

(72) Inventors: Regis J. Nero, Jr., Export, PA (US); Steven J. Fleck, Pittsburgh, PA (US)

(73) Assignee: Stryker Combo L.L.C., Bingham Farms, MI (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/349,590

(22) Filed: Nov. 11, 2016

(65) Prior Publication Data

US 2017/0062903 A1   Mar. 2, 2017

Related U.S. Application Data

(63) Continuation of application No. 13/925,062, filed on Jun. 24, 2013, now Pat. No. 9,515,376, which is a
(Continued)

(51) Int. Cl.
| | |
|---|---|
| *H04Q 5/22* | (2006.01) |
| *H01Q 1/22* | (2006.01) |
| *G06K 7/10* | (2006.01) |
| *H01Q 1/24* | (2006.01) |
| *G06K 19/077* | (2006.01) |
| *H01Q 1/36* | (2006.01) |
| *H01Q 5/335* | (2015.01) |

(52) U.S. Cl.
CPC ....... *H01Q 1/2216* (2013.01); *G06K 7/10366* (2013.01); *G06K 19/07771* (2013.01); *G06K 19/07786* (2013.01); *H01Q 1/22* (2013.01); *H01Q 1/24* (2013.01); *H01Q 1/245* (2013.01); *H01Q 1/36* (2013.01); *H01Q 5/335* (2015.01); *Y10T 29/49018* (2015.01)

(58) Field of Classification Search
None
See application file for complete search history.

(56) References Cited

U.S. PATENT DOCUMENTS

| | | | |
|---|---|---|---|
| 5,917,450 A | 6/1999 | Tsunekawa et al. |
| 6,517,000 B1 | 2/2003 | McAllister et al. |

(Continued)

*Primary Examiner* — Brian Zimmerman
*Assistant Examiner* — Renee Dorsey
(74) *Attorney, Agent, or Firm* — Howard & Howard Attorneys PLLC

(57) ABSTRACT

Systems and methods are provided for an antenna coupler mechanism. The antenna coupler mechanism includes a first tuning leg, a second tuning leg, and a bottom plate. The first tuning leg includes a first inductive circuit element, the first tuning leg being configured to accept a radio frequency device in series with the first inductive circuit element. The second tuning leg includes a second inductive circuit element and a capacitive circuit element connected in series, the second tuning leg being connected electrically in parallel with the first tuning leg. In addition, the bottom plate includes a third inductive circuit element connected electrically in parallel with the first tuning leg and connected electrically in parallel with the second tuning leg, the bottom plate being configured to couple energy into a nearby structure.

5 Claims, 15 Drawing Sheets

Related U.S. Application Data continuation of application No. 13/358,168, filed on Jan. 25, 2012, now Pat. No. 8,477,076.

(56) References Cited

U.S. PATENT DOCUMENTS

| | | | |
|---|---|---|---|
| 7,508,347 B2 | 3/2009 | Sakama et al. | |
| 7,880,614 B2 | 2/2011 | Forster et al. | |
| 7,938,334 B2 | 5/2011 | Jesme et al. | |
| 8,004,369 B2 | 8/2011 | Kwon et al. | |
| 8,023,890 B2 | 9/2011 | Washiro | |
| 8,063,760 B2 | 11/2011 | Volpi et al. | |
| 2006/0187059 A1* | 8/2006 | Fabian | A61B 5/06 340/572.8 |
| 2007/0232867 A1 | 11/2007 | Westrick et al. | |
| 2007/0262867 A1* | 11/2007 | Westrick | G06K 19/07749 340/572.7 |
| 2009/0079568 A1 | 3/2009 | Forster et al. | |
| 2011/0254745 A1 | 10/2011 | Tsujimura et al. | |
| 2013/0306740 A1 | 11/2013 | Mathews et al. | |

\* cited by examiner

ANTENNA COUPLER MECHANISM

CROSS REFERENCE TO RELATED APPLICATIONS

This application is a continuation application of U.S. patent application Ser. No. 13/925,062, filed on Jun. 24, 2013, entitled "Antenna Coupler Mechanism" which is a continuation of Ser. No. 13/358,168, filed on Jan. 25, 2012, entitled "Antenna Coupler Mechanism," the entirety of each is herein incorporated by reference.

This application is related to U.S. patent application Ser. No. 13/358,199, filed Jan. 25, 2012, entitled Antenna Coupler Mechanism Systems and Methods, the entirety of which is herein incorporated by reference.

TECHNICAL FIELD

This disclosure relates generally to radio frequency antenna systems and more particularly to a coupler mechanism configured to maximize energy coupling between a radio frequency device and a metallic object.

BACKGROUND

Tracking the location of objects can be important in a wide variety of contexts, including medical, retail sales, and sports contexts. For example, in the medical context, leaving a surgical instrument behind in a patient's body during surgery can cause injury or death to the patient and can expose a health care provider to liability. If the location of the surgical instrument can be tracked throughout the course of the surgery and following it, the incidence of such accidents can be minimized.

SUMMARY

The present disclosure is directed to an antenna coupler mechanism. In one embodiment, the antenna coupler mechanism includes a first tuning leg, a second tuning leg, and a bottom plate. The first tuning leg includes a first inductive circuit element, the first tuning leg being configured to accept a radio frequency device in series with the first inductive circuit element. The second tuning leg includes a second inductive circuit element and a capacitive circuit element connected in series, the second tuning leg being connected electrically in parallel with the first tuning leg. In addition, the bottom plate includes a third inductive circuit element connected electrically in parallel with the first tuning leg and connected electrically in parallel with the second tuning leg, the bottom plate being configured to couple energy into a nearby structure.

The present disclosure is also directed to a method of coupling energy between a radio frequency device and a metallic object. An example method includes placing a bottom plate comprising a first inductive circuit element near a metallic object. The bottom plate is configured to couple energy into the metallic object. A first tuning leg is electrically connected in parallel with the bottom plate, and includes a second inductive circuit element. A second tuning leg is electrically connected in parallel with the bottom plate and electrically in parallel with the first tuning leg. The second tuning leg includes a third inductive circuit element and a capacitive circuit element connected in series. A radio frequency device is incorporated into the first tuning leg. The metallic object is configured to receive energy that is coupled from the radio frequency device via the bottom plate.

The present disclosure is also directed to a system for determining a location of a metallic object. An example system includes an antenna coupler mechanism that includes a first tuning leg, a second tuning leg, and a bottom plate. The first tuning leg includes a first inductive circuit element configured to accept a radio frequency device in series with the first inductive circuit element. The second tuning leg includes a second inductive circuit element and a capacitive circuit element connected in series, and the second tuning leg is connected electrically in parallel with the first tuning leg. The bottom plate includes a third inductive circuit element connected electrically in parallel with the first tuning leg and connected electrically in parallel with the second tuning leg. A radio frequency transceiver is configured to send an interrogation signal to the radio frequency device and to receive a response signal originating from the radio frequency device. A metallic object is connected to the antenna coupler mechanism, and is configured to receive the response signal via the bottom plate. Further, the metallic object is configured to transmit the response signal to the radio frequency transceiver.

DETAILED DESCRIPTION

Radio frequency (RF) devices (e.g., RF integrated circuits, RFID integrated circuits) are useful for tracking the location of objects. For example, an RFID tag may be affixed to an object and configured to transmit its unique identification number or other identifying information in response to an interrogation signal. However, tracking metallic objects with RF devices in this manner may be difficult. For example, placing a small (e.g., less than one-tenth the RF device's operating wavelength) RFID tag containing an internal antenna near a metallic object often results in low radiation resistance, a poor impedance match, and poor efficiency at higher frequencies. This can result in a short read range for the RFID tag, which severely limits its location-tracking capabilities.

RF devices generally require the use of an antenna that is commensurate in size with the wavelength of the operating frequency of the RF device. In some scenarios, it may be beneficial to use an object to which the RF device is affixed to aid in broadcasting signals emitted by the RF device. In such configurations, although the signal originates with the RF device, the object to be tracked acts as the actual radiating element. Because antennas are conductive in nature, metallic objects of lengths approximately equal to one-half the operating wavelength of the RF device can serve as suitable antennas, in theory.

An antenna coupler mechanism can provide an interface between an RF device and a metallic object to be used as a radiating antenna. The antenna coupler mechanism allows for increased energy coupling between the RF device and the metallic object by providing an impedance match between the RF device and the metallic object and by providing a coupling mechanism. The antenna coupler mechanism can be fabricated from standard printed circuit board material (e.g., FR4) and/or using discrete electrical components. Two exemplary RF devices that may be used with the antenna coupler mechanism include the NXP RFID UCODE G2iL and Silicon Labs Si4010 integrated circuits.

Figure 1A:
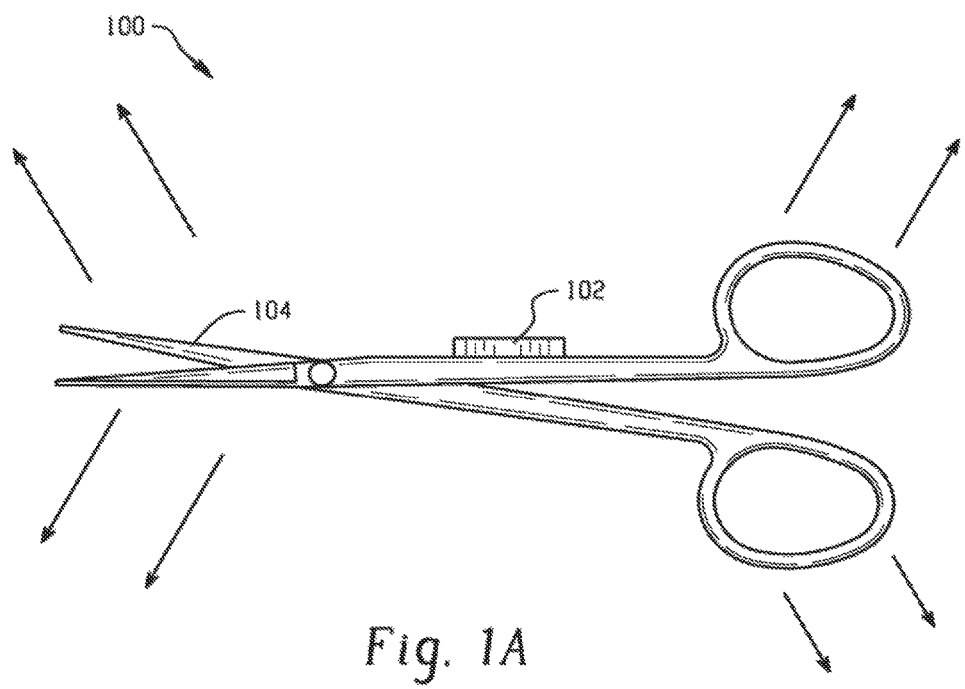
FIGS. 1A and 1B depict a metallic object to be tracked by an RF device.
Figure 1B:
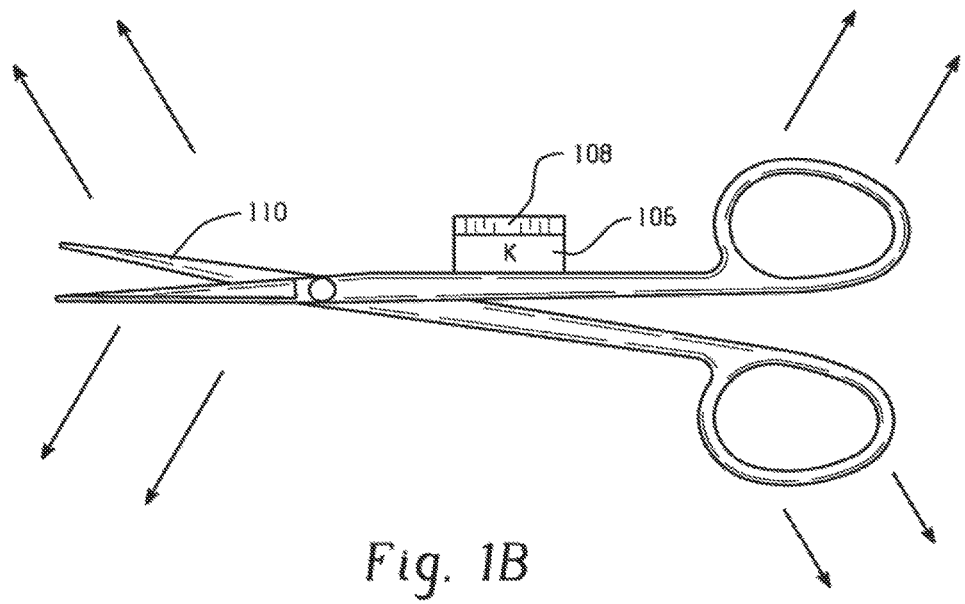

FIGS. 1A and 1B depict a metallic object to be tracked by an RF device. In FIG. 1A, the RF device 102 is affixed directly to a surface of the metallic object 104. The RF device 102 could be, for example, an RFID tag. In FIG. 1A, the location of the metallic object 104 may not be tracked properly, due to the aforementioned problems that may be encountered when an RF device is placed near metal.

FIG. 1B, by contrast, depicts the use of an antenna coupler mechanism 106 as an interface between an RF device 108 and a metallic object 110. A length of the metallic object is on the order of one-half of the operating wavelength of the RF device. The antenna coupler mechanism 106 provides an interface that is conducive to energy coupling between the RF device 108 and the metallic object 110 and allows for impedance matching between the RF device 108 and the metallic object 110. Due to the increased energy coupling between the two elements 108, 110, the metallic object 110 can function as an antenna, and the RF device's signals can be read at greater distances. An antenna has the characteristic of reciprocity, and as such, the antenna coupler mechanism 106 follows this theorem in that the antenna coupler mechanism 106 plus metallic object 110 form an antenna that operates identically in either direction.

Figure 2:
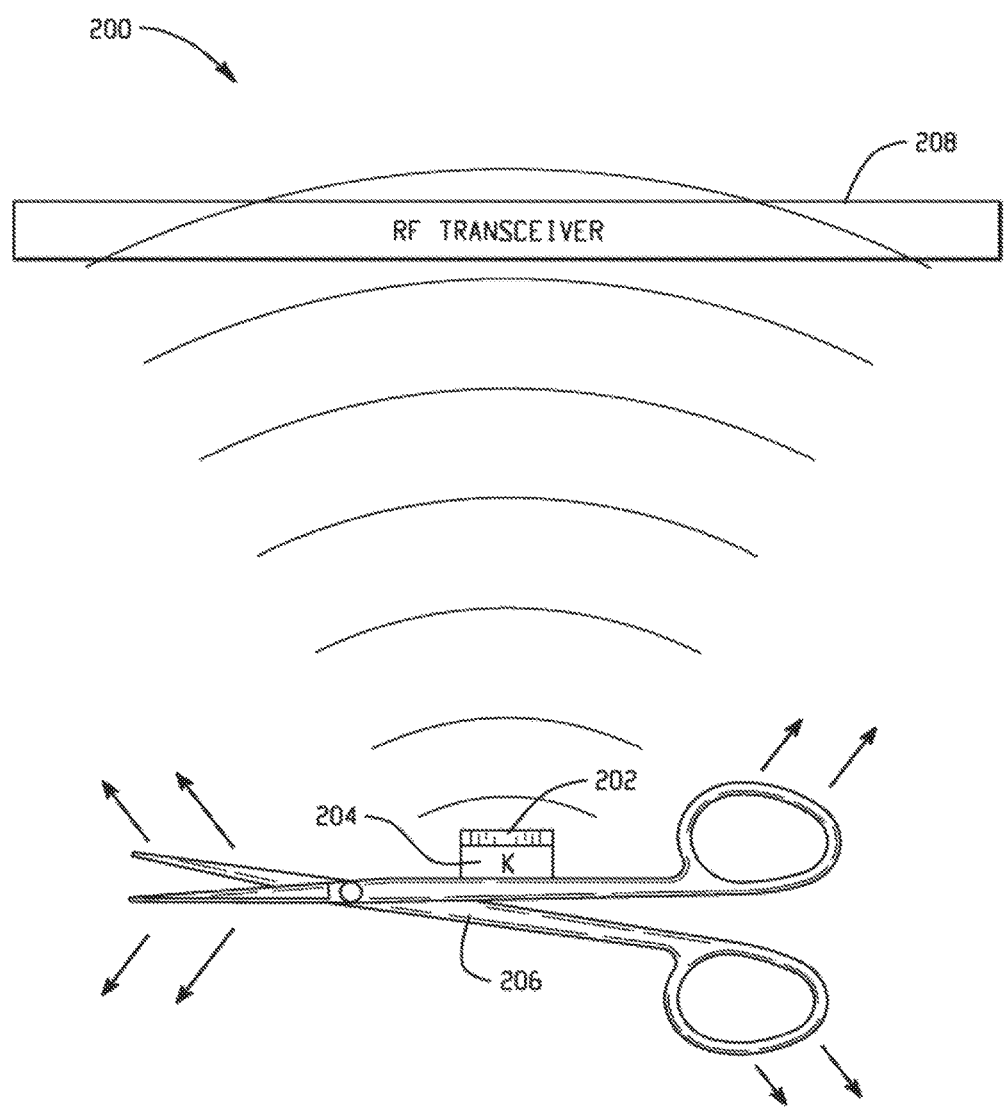
FIG. 2 depicts an antenna coupler mechanism used to enable an RF device to communicate with an RF transceiver located a distance away from the RF device.

FIG. 2 depicts an antenna coupler mechanism used to enable an RF device to communicate with an RF transceiver located a distance away from the RF device. An RF device 202 with a poorly-coupled metallic object antenna may be used only with transceivers located at close distances. By contrast, using the antenna coupler mechanism 204 with a metallic object 206 as an antenna can enable the RF transceiver 208 to receive a signal from the RF device 202 at a longer distance. The RF device's signal may be read reliably in both the near field and the far field. Thus, the antenna coupler mechanism 204 may enable the use of remote receivers and more sophisticated applications (e.g., location tracking and remote environment sensing, etc.).

Figure 3:
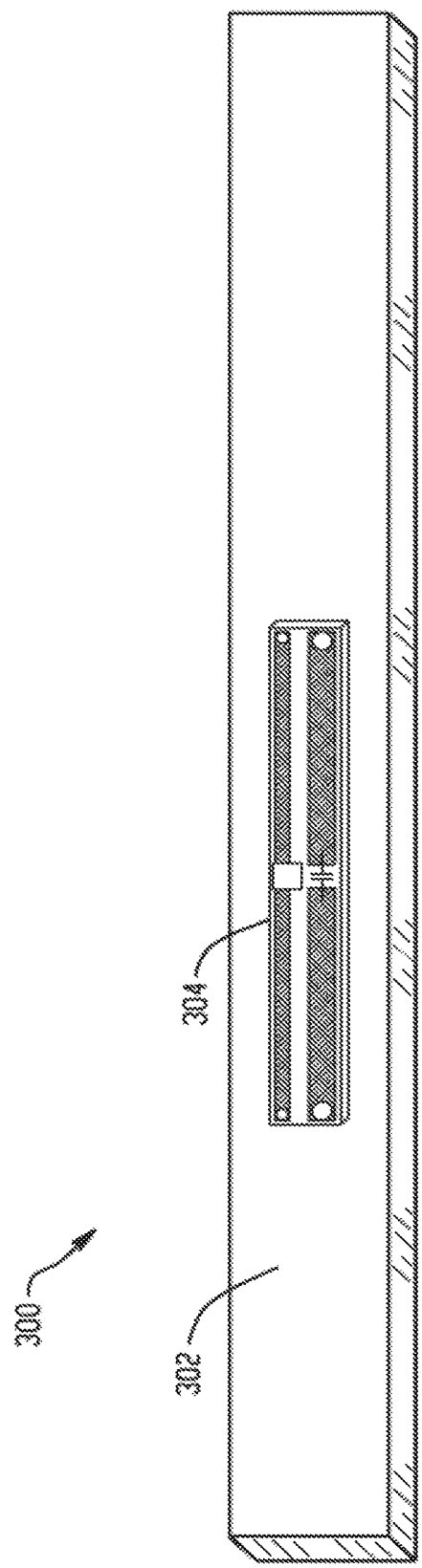
FIG. 3 depicts an antenna coupler mechanism mounted on a surface of a metallic object.

FIG. 3 depicts an antenna coupler mechanism mounted on a surface of a metallic object. For use as an antenna, the metallic object 302 may have a length near one-half of an operating wavelength of an RF device. For example, the center frequency of the UHF radio frequency identification band has a wavelength of approximately 328 millimeters, and metallic objects with lengths ranging from 100 millimeters to 230 millimeters may be effective antennas when used with the antenna coupler mechanism 304. A shape of the metallic object 302 can be geometrically non-uniform, allowing objects such as surgical instruments, tools, and food utensils to be used as antennas, especially when their length is approximately one-half the operating wavelength. Placement of the antenna coupler mechanism 304 is ideally in the center of the metallic object, but the antenna coupler mechanism 304 can operate well over a wide variation from this location. Although FIG. 3 depicts the antenna coupler mechanism 304 as protruding from the surface of the metallic object, alternative embodiments include where the antenna coupler mechanism 304 is placed within a recess of the metallic object 302, thus allowing the metallic object 302 to retain its original appearance.

Figure 4:
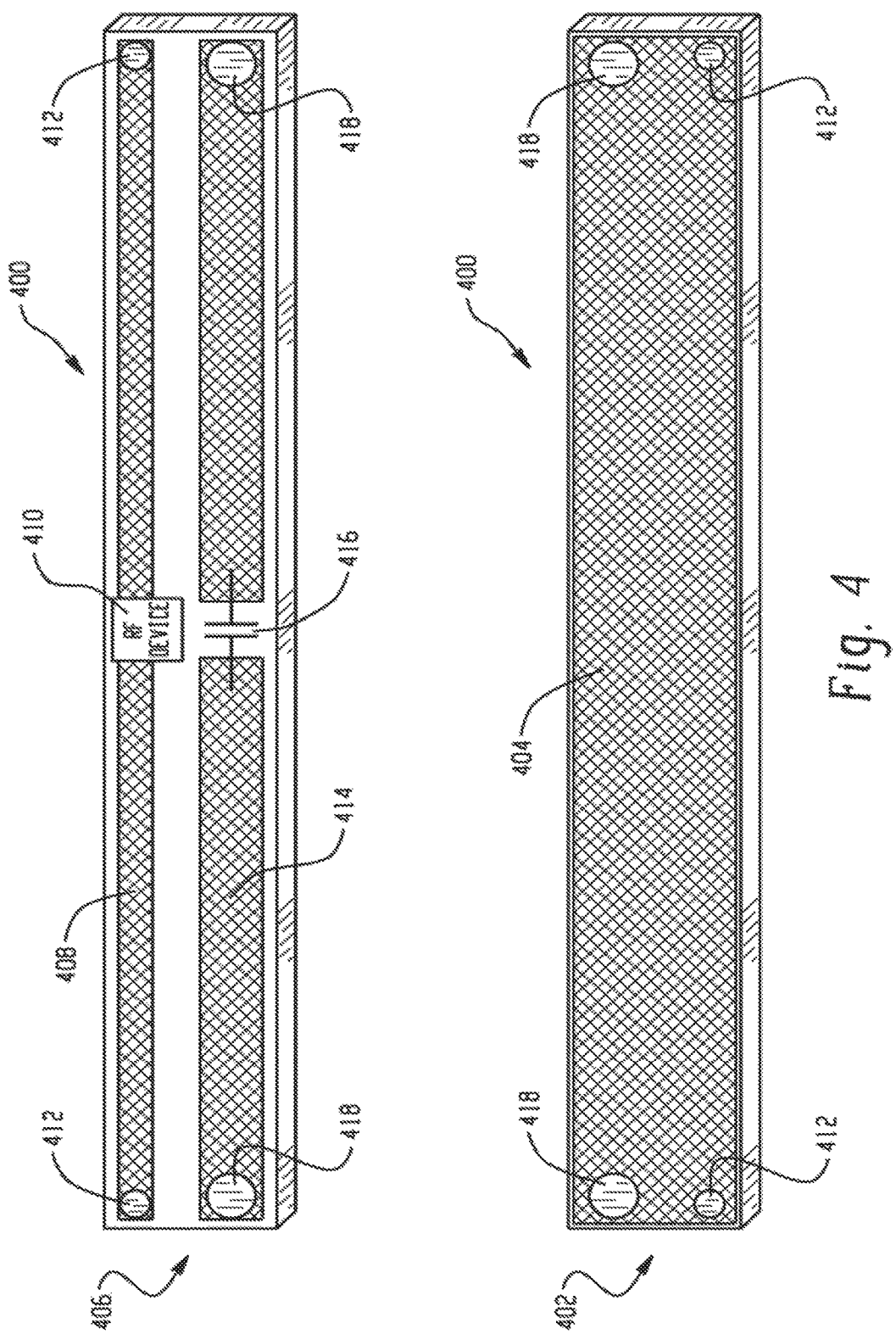
FIG. 4 depicts top and bottom views of an antenna coupler mechanism fabricated on printed circuit board.

FIG. 4 depicts top and bottom views of an antenna coupler mechanism fabricated on printed circuit board. In this example, the antenna coupler mechanism 400 is fabricated on standard printed circuit board material such as two-sided FR4. On the bottom side 402, a first conductor 404 covers a substantial portion of the bottom side of the antenna coupler mechanism. On the top side 406, a first tuning leg 408 comprises a second conductor connected in series with an RF device 410 (e.g., an RFID tag or an RF integrated circuit). The first tuning leg 408 is connected in a parallel electrical configuration with the bottom plate 404 by a first set of electrical connections 412. The top side 406 also includes a second tuning leg 414, which comprises a third conductor connected in series with a capacitor 416. The second tuning leg 414 is connected in a parallel electrical configuration with the bottom plate 404 by a second set of electrical connections 418. With reference back to FIG. 3, the antenna coupler mechanism is placed on the metallic object such that the top side 406 of the antenna coupler mechanism is faced up, and the bottom side 402 of the antenna coupler mechanism is faced down towards the metallic object. The bottom plate 404, placed in close proximity with the metallic object, is used to couple energy from the RF device to the metallic object.

In one example, the first, second, and third conductors 404, 408, 414, may be conductive traces printed on the top and bottom sides of the printed circuit board, and the first and second sets of electrical connections 412, 418 may be conductive vias used to connect the traces on the top and bottom sides. Because the bottom plate 404 covers most of the bottom side 402 of the antenna coupler mechanism, the first 412 and second 418 sets of electrical connections are electrically connected, resulting in the first 408 and second 414 tuning legs to be connected to each other via a parallel electrical configuration.

Figure 5:
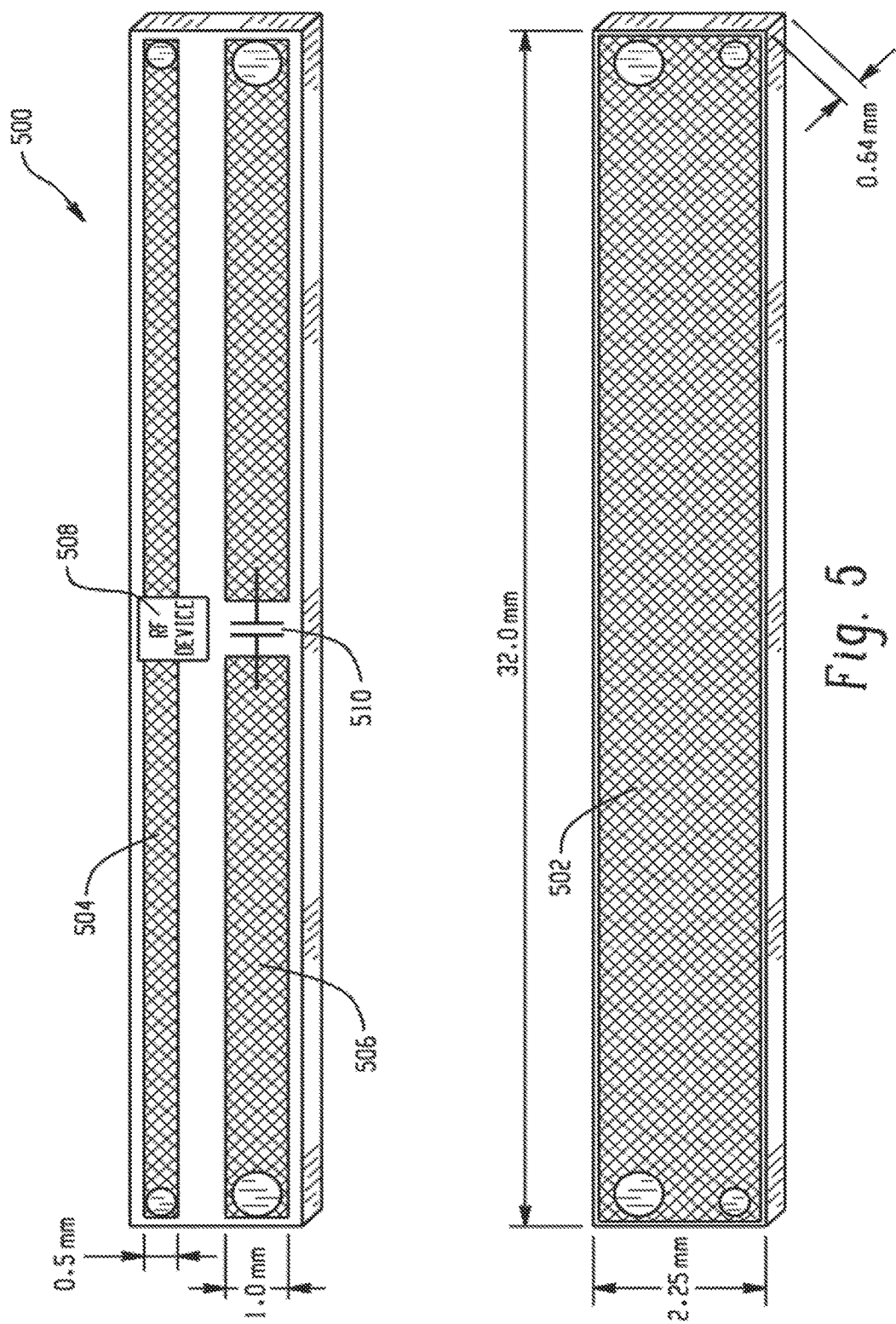
FIG. 5 illustrates a first set of example dimensions for an antenna coupler mechanism.

FIG. 5 illustrates a first set of example dimensions for an antenna coupler mechanism. In this example, the antenna coupler mechanism has a length, width, and thickness of 32.0 millimeters, 2.25 millimeters, and 0.64 millimeters, respectively. A first conductor 502 comprises a trace on a bottom side of the antenna coupler mechanism and has a width of 2.25 millimeters, covering most of the bottom side. Second 504 and third 506 conductors comprise traces on a top side of the antenna coupler mechanism and have widths of 0.5 millimeters and 1.0 millimeters, respectively. In this example, an NXP UCODE G2iL RF device 508 operating in the 902-928 MHz band is connected in series with the second conductor 504. A capacitor 510 having a capacitance value of 2.1 pF is connected in series with the third conductor 506.

Figure 6:
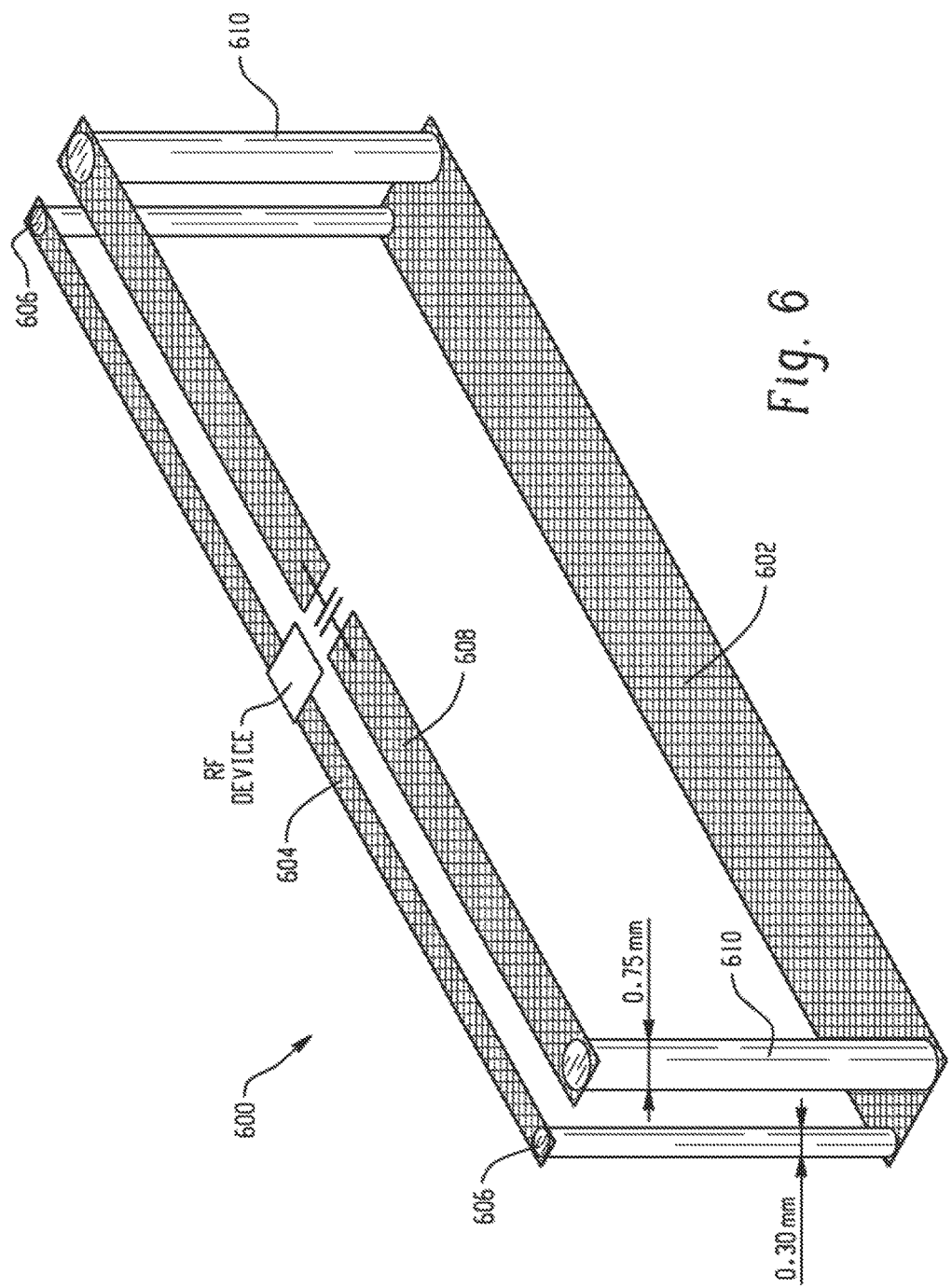
FIG. 6 illustrates a second set of example dimensions for another antenna coupler mechanism.

FIG. 6 illustrates a second set of example dimensions for another antenna coupler mechanism. For illustrative purposes, an exaggerated distance between top and bottom sides is depicted in FIG. 6. Further, printed circuit board dielectric material separating the top and bottom sides is removed to illustrate electrical connections between the top and bottom sides. A first conductor forms a bottom plate 602 that is connected in parallel with a first tuning leg 604 using a first set of electrical connections 606. The bottom plate 602 is also connected in parallel with a second tuning leg 608 using a second set of electrical connections 610. The first set of electrical connections 606 used with the first tuning leg 604 are smaller than the second set of electrical connections 610 used with the second tuning leg 608. In this example, the first 606 and second 610 sets of electrical connections comprise conductive vias with diameters of 0.30 millimeters and 0.75 millimeters, respectively.

With reference to FIGS. 5 and 6, the first tuning leg trace 504 and the first set of electrical connections vias 606 are smaller than the second tuning leg trace 506 and the second set of electrical connections vias 610. The smaller traces and vias have a greater intrinsic inductance than the larger traces and vias, causing the inductance from the capacitor to the bottom plate to be of a lower value than the inductance from the RF device to the bottom plate. Further, because the bottom plate trace is the widest of all conductors, it has the lowest overall inductance of the traces and vias.

Although the first and second sets of electrical connections are depicted as conductive vias in FIGS. 5 and 6, alternative embodiments are included within the scope of this disclosure. For example, the first and second sets of electrical connections may each include a set of parallel metallic plates, such that electrical connections between top and bottom sides of the antenna coupler mechanism are made through capacitive coupling.

Modification of any of the dimensions or other parameters of components depicted in FIGS. 5 and 6 can result in changes in energy coupling between the bottom plate and the metallic object. Modifying a capacitance value of the capacitor or dimensions of the traces, vias, or the antenna coupler mechanism itself changes the energy coupling by transforming an impedance formed by a combination of an inductance value of the bottom plate in parallel with an impedance value of the metallic object.

Figure 7:
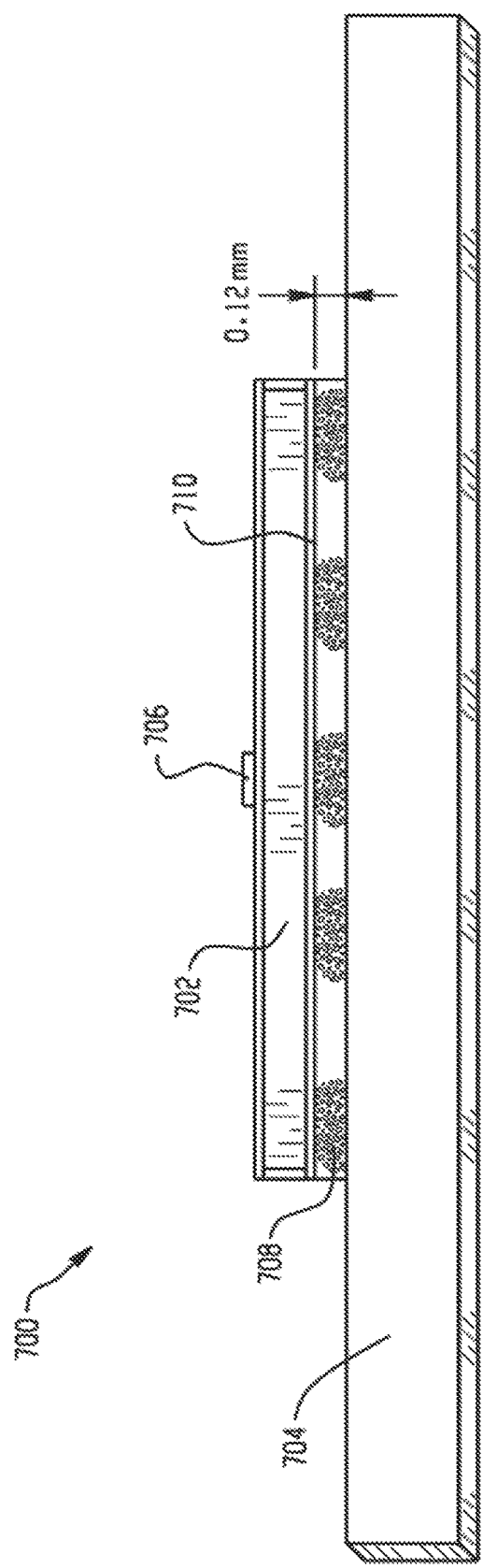
FIG. 7 depicts a side profile view of an antenna coupler mechanism mounted on a metallic object.

FIG. 7 depicts a side profile view of an antenna coupler mechanism mounted on a metallic object. In this example, the antenna coupler mechanism 702 is mounted on a surface of the metallic object 704, and an RF device 706 protrudes from a top surface of the antenna coupler mechanism 702. The antenna coupler mechanism 702 is mounted on the metallic object 704 using a dielectric adhesive material 708, which creates a controlled amount of spacing between a bottom plate 710 of the antenna coupler mechanism 702 and the metallic object 704. In one example, the amount of spacing is 0.12 millimeter. Manipulation of the area of the bottom plate 710, the amount of spacing, or the material occupying the amount of spacing can change the energy coupling between the bottom plate 710 and the metallic object 704. The metallic bottom plate 710 and the metallic object 704, placed in close proximity with the dielectric material 708 separating them, form a capacitor. Although this example utilizes the dielectric adhesive material 708, suspended structures with only air separating the bottom plate 708 and the metallic object 704 may also be fabricated.

Figure 8:
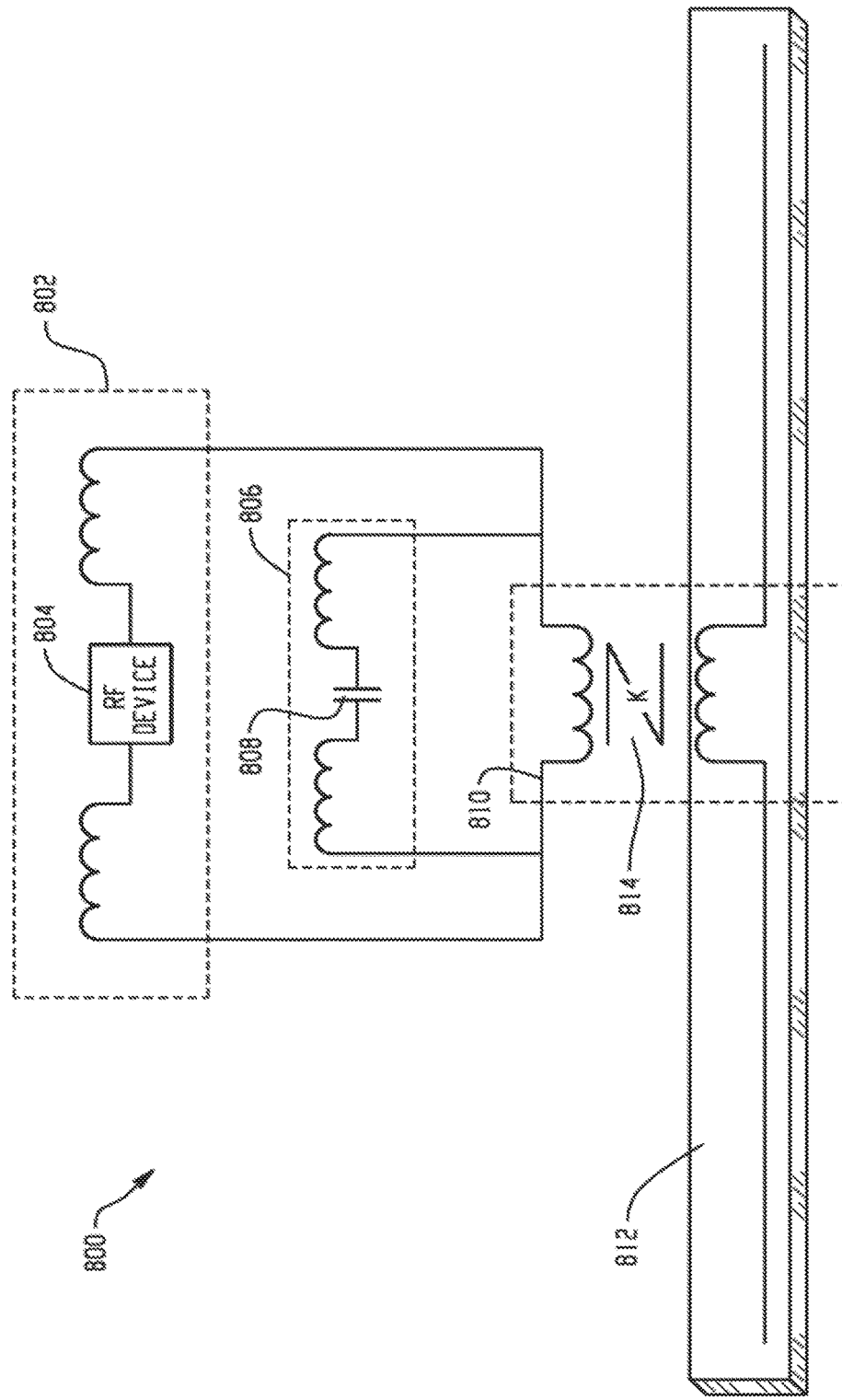
FIG. 8 depicts a circuit diagram illustrating circuit elements of an antenna coupler mechanism.

FIG. 8 depicts a circuit diagram illustrating circuit elements of an antenna coupler mechanism. A first tuning leg 802 includes a first inductive circuit element in series with an RF device 804, and a second tuning leg 806 includes a second inductive circuit element in series with a capacitive circuit element 808. In this example, an inductance value of the first inductive circuit element is higher than an inductance value of the second inductive circuit element. Further, in this example, the first inductive circuit element comprises two inductors connected in series, and the second inductive circuit element also comprises two inductors connected in series. A bottom plate 810 comprising a third inductive circuit element is connected in parallel with the first tuning leg 802 and in parallel with the second tuning leg 806. Through these parallel connections with the bottom plate 810, the first and second tuning legs are also connected in parallel. The bottom plate 810 is placed in close proximity with a metallic object 812, and the bottom plate is configured to couple energy to the metallic object 812.

The antenna coupler mechanism is used to provide a coupling mechanism 814 between the RF device 804 and the metallic object 812 and to enable impedance matching between the RF device 804 and the metallic object 812. The coupling mechanism 814 includes a combination of inductive and capacitive coupling that occurs between the bottom plate 810 inductance in parallel with an impedance value of the metallic object 812. The coupling mechanism 814 causes the impedance value of the metallic object 812 to be increased by a coupling factor K. The coupling factor K is primarily controlled by an area of the bottom plate 810, an amount of spacing between bottom plate 810 and metallic object 812, and a material occupying the amount of spacing. By changing one or more of these values, the coupling factor K is modified, and energy coupling between the bottom plate 810 and the metallic object 812 changes. For example, decreasing the amount of spacing increases the coupling factor K and results in increased energy coupling between the two elements.

A complex conjugate impedance match between the RF device 804 and the metallic object 812 can be achieved by modifying inductance and capacitance values of the first 802 and second 806 tuning legs. Modifying these values enables matching of the impedance of the metallic object 812 to the RF device 804 by transforming an impedance value formed by the combination of the inductance value of the bottom plate 810 in parallel with the impedance value of the metallic object 812 (hereinafter "coupling mechanism impedance"). When matching the impedance value of the RF device 804 in this manner, the coupling mechanism impedance is generally transformed to increase its inductive reactance. In the example of FIG. 8, the inductance value of the bottom plate 810 is relatively low, and thus, values of the circuit elements must be modified to increase the inductive reactance of the bottom plate 810 in order to properly transform the coupling mechanism impedance as needed.

The coupling mechanism impedance can be transformed via one or more of the following. First, the amount of spacing between the bottom plate 810 and the metallic object 812 can be decreased to increase energy coupling between the two elements. As noted above, decreasing the amount of spacing can increase the coupling factor K. Increasing the coupling factor K in this manner can increase the real impedance and reduce the inductive reactance of the coupling mechanism impedance, assuming that the length of the metallic object is near one-half the RF device's operating wavelength. Additionally, the capacitance value of the capacitive circuit element 808 and the inductance value of the second tuning leg 806 can be increased to affect both real and reactive impedance of the coupling mechanism impedance. In the present example, increasing these values results in increasing both the real impedance and the inductive reactance values of the coupling mechanism impedance. Further, an inductance value of the first tuning leg 802 can be increased to further increase inductive reactance of the coupling mechanism impedance. Performing one or more of these actions allows the complex conjugate impedance of the metallic object to be modified to approximate that of the RF device.

The circuit diagram of FIG. 8 can be constructed with discrete inductor and capacitor circuit elements. Alternatively, FIG. 8 can be viewed as an electrical model formed when circuit elements of FIGS. 4-7 are used. Thus, the inductive circuit elements of FIG. 8 may be viewed as intrinsic inductances of the traces and vias of FIGS. 5 and 6.

Figure 9:
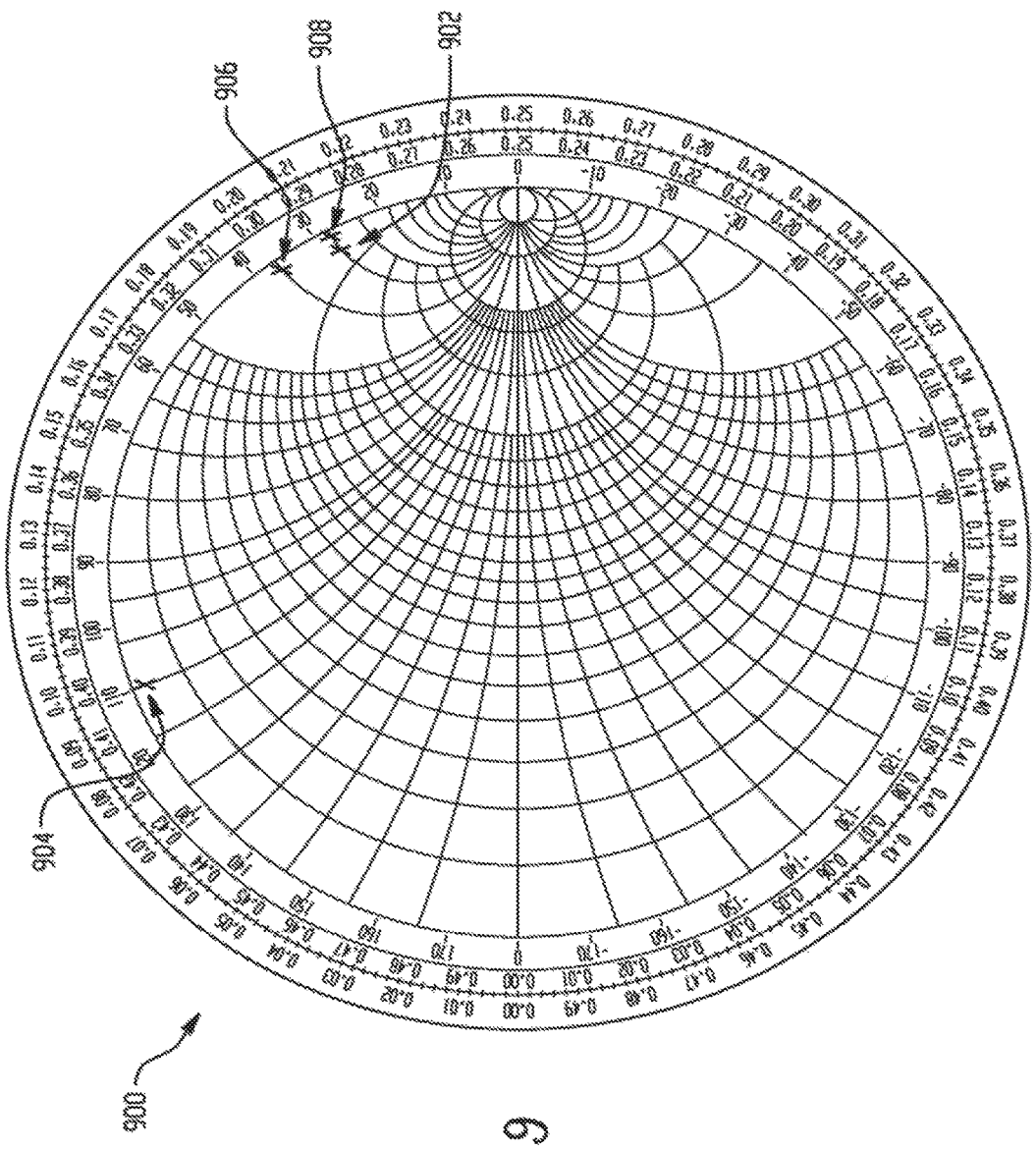
FIG. 9 depicts a Smith Chart illustrating an impedance matching capability of an antenna coupler mechanism.

FIG. 9 depicts a Smith Chart illustrating an impedance matching capability of an antenna coupler mechanism. With reference to FIG. 8, in the present example, the RF device is a NXP UCODE G2iL IC RFID integrated circuit. This device has a complex conjugate impedance of 21+j199, shown on the Smith Chart of FIG. 9 at 902. To achieve impedance matching, the impedance formed by the combination of the inductance value of the bottom plate in parallel with the impedance value of the metallic object (hereinafter "coupling mechanism impedance") is transformed to approximate the complex conjugate impedance value of the RF device by modifying circuit elements as described above. An intrinsic impedance value of the bottom plate is determined empirically to be 0.45+j35, which is found at location 904. This low impedance value initially dominates the coupling mechanism impedance. By increasing an inductance value and a capacitance value of the elements of the second tuning leg, the coupling mechanism impedance is transformed from location 904 to location 906 (10+j156). By modifying an inductance value of first tuning leg, the coupling mechanism impedance is transformed from location 906 to location 908 (10+j200). At this point, the coupling mechanism impedance of 10+j200 approximates that of the RF device at 21+j199, allowing for efficient energy coupling between the two elements.

Figure 10:
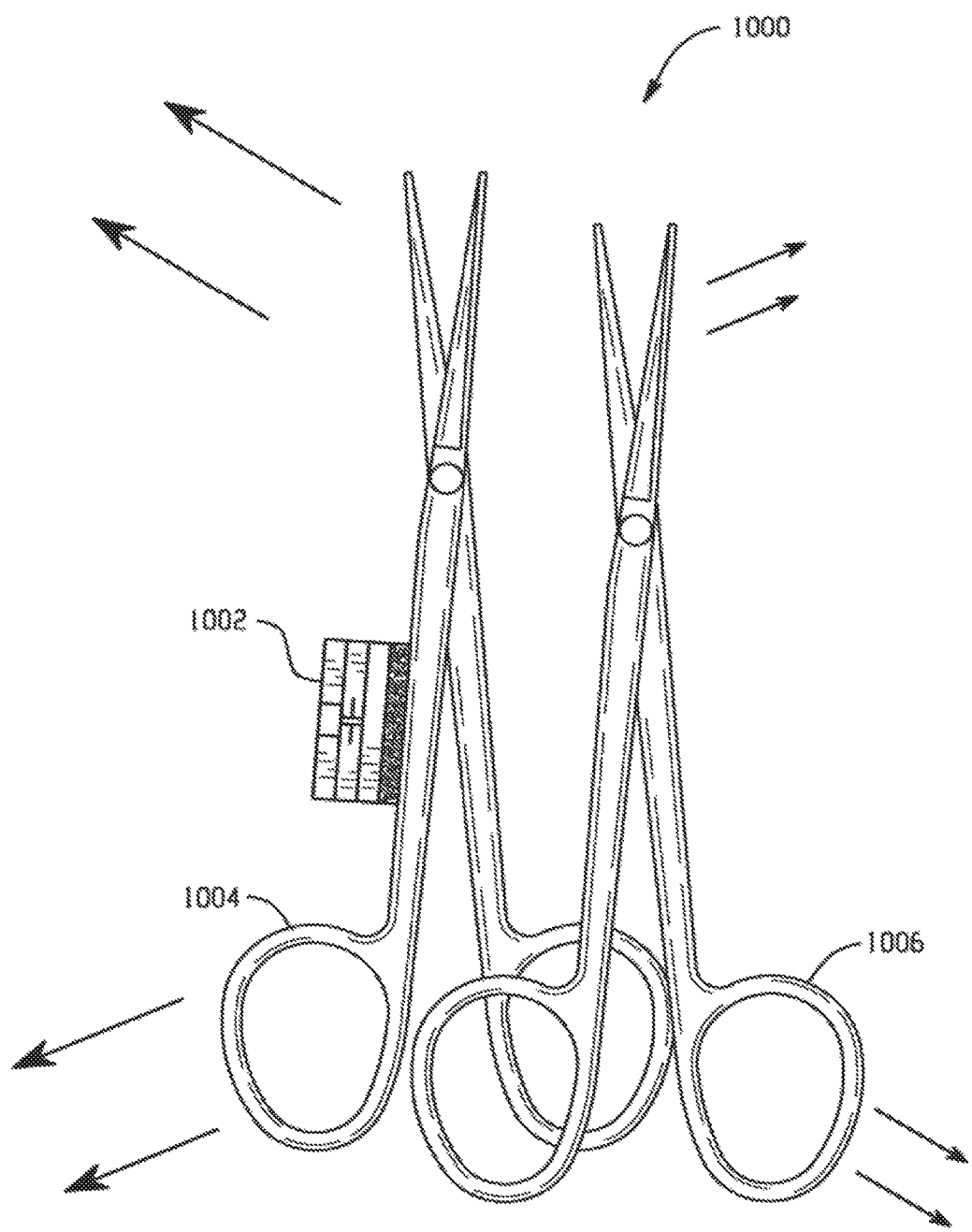
FIG. 10 depicts two metallic objects in close proximity to illustrate a tuning capability of an antenna coupler mechanism.

FIG. 10 depicts two metallic objects in close proximity to illustrate a tuning capability of an antenna coupler mechanism. In practice, multiple metallic objects may be placed in close proximity with each other (e.g., surgical instruments may be placed in a pile on a table in an operating room). Thus, in FIG. 10, an RF device 1002 is adhesively bonded to one metallic object 1004, and another metallic object 1006 is located a short distance away. The coupler mechanism impedance transformation is such that major impedance changes to the metallic object 1004 have minor changes to impedance seen by the RF device 1002. A bottom trace of the antenna coupler mechanism has a small impedance, and this small impedance is in parallel with a larger impedance of the metallic object 1004. Therefore, changes in the metallic object's impedance caused by another metallic object 1006 being nearby have little influence on the overall impedance seen by the RF device 1002.

Figure 11A:
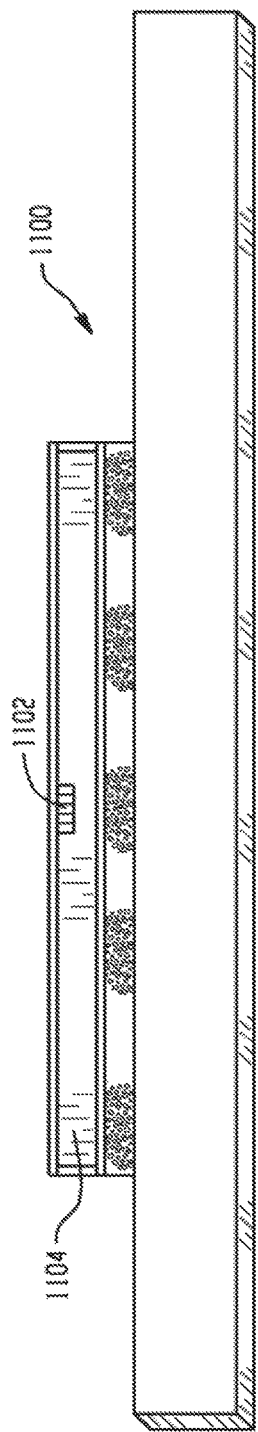
FIGS. 11A, 11B, and 11C depict three alternative configurations for an antenna coupler mechanism.
Figure 11B:
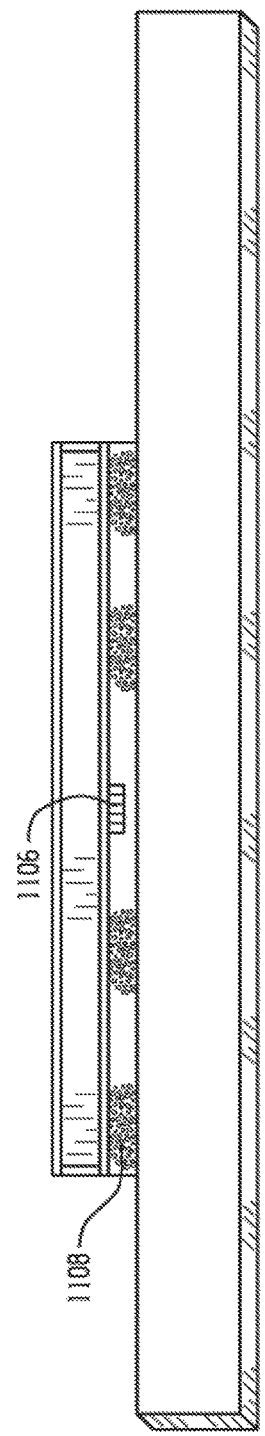
Figure 11C:
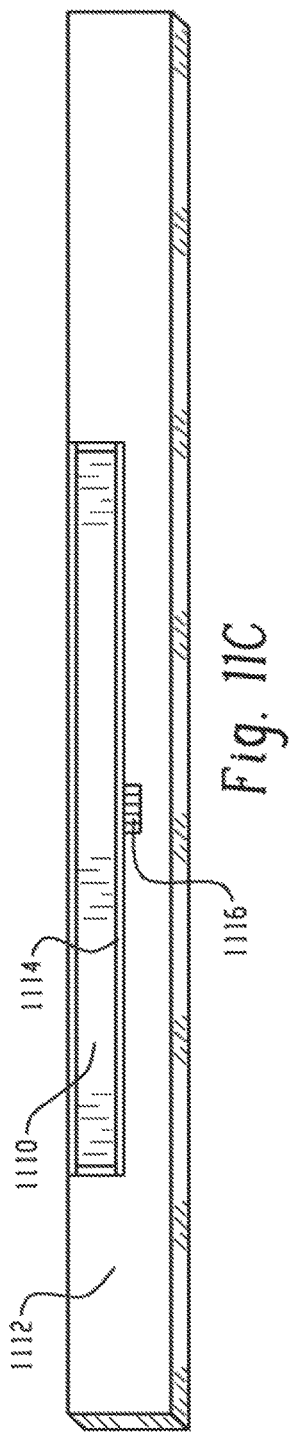

FIGS. 11A, 11B, and 11C depict three alternative configurations for an antenna coupler mechanism. With reference to FIG. 7, the antenna coupler mechanism may be placed on the surface of the metallic object, with capacitor and RF device elements protruding from the top surface of the antenna coupler mechanism. Alternatively, as depicted in FIG. 11A, the capacitor and RF device elements 1102 may be countersunk into the surface of the antenna coupler mechanism 1104, enabling the antenna coupler mechanism 1104 to have a flat top surface.

Another alternative embodiment is depicted in FIG. 11B, wherein the capacitor and RF device elements 1106 are located within a material 1108 separating the antenna coupler mechanism and a metallic object. Like the embodiment depicted in FIG. 11A, this design also allows the antenna coupler mechanism to have a flat top surface.

FIG. 11C depicts a third alternative embodiment of the antenna coupler mechanism, wherein the entire antenna coupler mechanism device 1110 is placed within a recess of metallic object 1112. When a bottom plate 1114 is made flush with a surface of the metallic object 1112, a portion of surface current flowing over the metallic object 1112 flows through the bottom plate 1114 and enables energy coupling to occur between RF device 1116 and the metallic object 1112.

Figure 12:
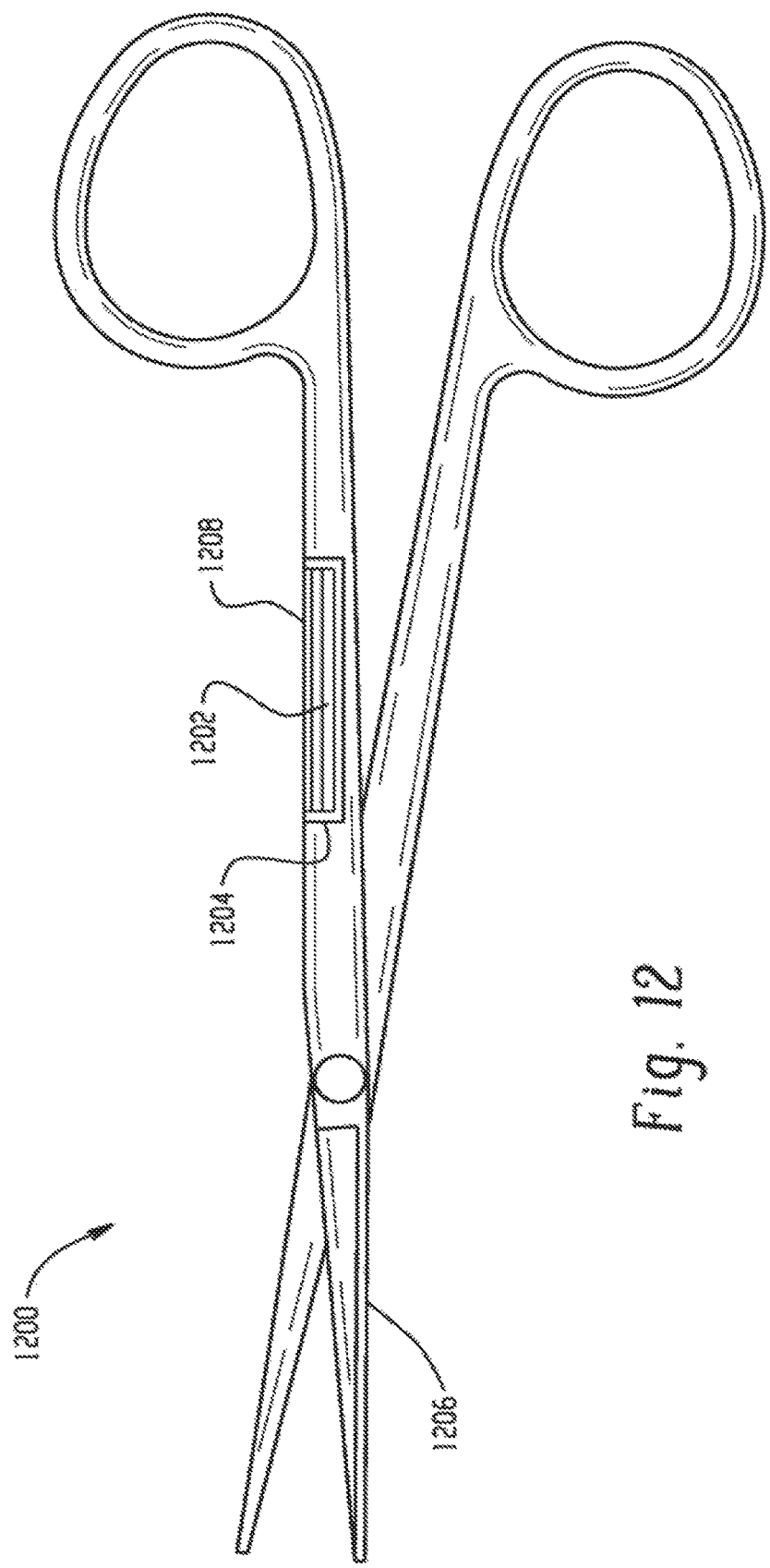
FIG. 12 depicts an antenna coupler mechanism placed within a recess of a metallic object.

FIG. 12 depicts an antenna coupler mechanism placed within a recess of a metallic object. In FIG. 12, the antenna coupler mechanism 1202 is placed within the recess 1204 of the metallic object 1206, with a bottom plate 1208 of the antenna coupler mechanism facing out of the recess, towards the nearby surface of the metallic object 1206. In this embodiment, an external non-metallic strip may be used to close the recess, as in FIG. 11C, or the metallic object may be fabricated to include the antenna coupler mechanism within a closed recess, as in FIG. 12. Placing the antenna coupler mechanism within the metallic object in such a manner enables the metallic object to retain its original appearance and prevents inadvertent removal of the antenna coupler mechanism from the metallic object.

Figure 13:
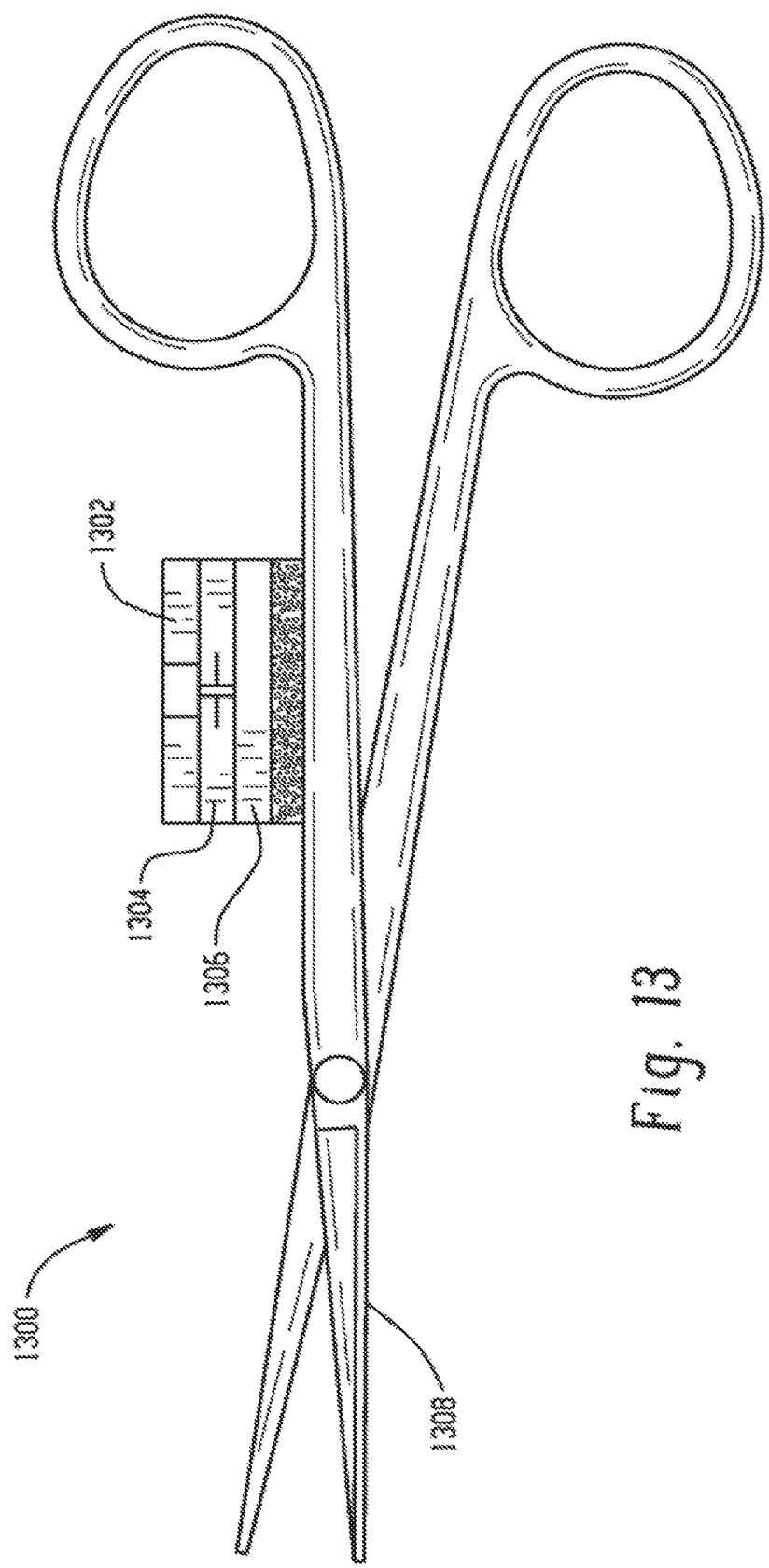
FIG. 13 depicts an antenna coupler mechanism with first tuning leg, second tuning leg, and bottom plate elements stacked vertically from a surface of a metallic object.

FIG. 13 depicts an antenna coupler mechanism with first tuning leg, second tuning leg, and bottom plate elements stacked vertically from a surface of a metallic object. In FIGS. 4-6, in one embodiment of the antenna coupler mechanism, the first and second tuning legs comprise a top plate, with the first tuning leg and the second tuning leg being coplanar. FIG. 13 depicts an alternative embodiment, where the first tuning leg 1302, the second tuning leg 1304, and the bottom plate 1306 are stacked vertically from the surface of the metallic object 1308, which can enable the antenna coupler mechanism to have a decreased width.

Figure 14:
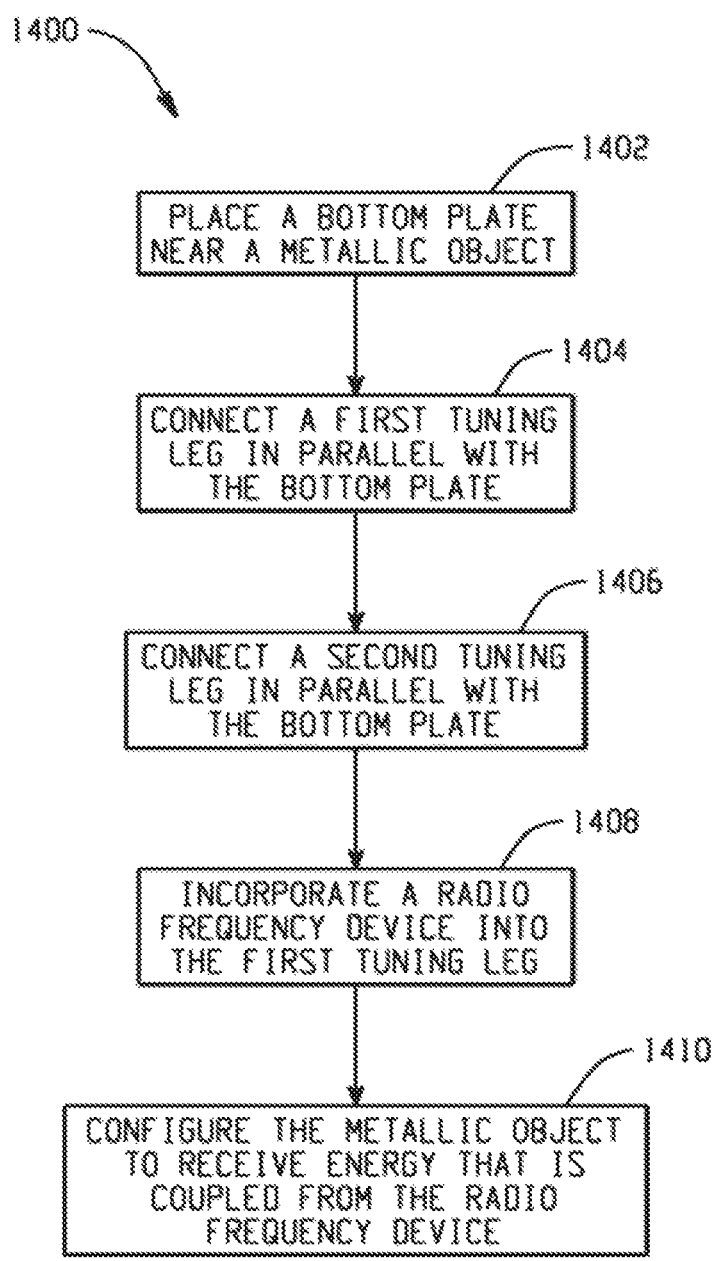
FIG. 14 is a flowchart illustrating a method of coupling energy from an RF device into a metallic object.

FIG. 14 is a flowchart illustrating a method of coupling energy between an RF device and a metallic object. At 1402, a bottom plate is placed near a metallic object. The bottom plate includes a first inductive circuit element and is configured to couple energy into the metallic object. At 1404, a first tuning leg is connected in parallel with the bottom plate. The first tuning comprises a second inductive circuit element. At 1406, a second tuning leg is connected in parallel with the bottom plate. The second tuning leg includes a third inductive circuit element and a capacitive circuit element connected in series. At 1408, the first tuning leg incorporates a radio frequency device. At 1410, the metallic object is configured to receive energy that is coupled from the radio frequency device via the bottom plate.

Figure 15:
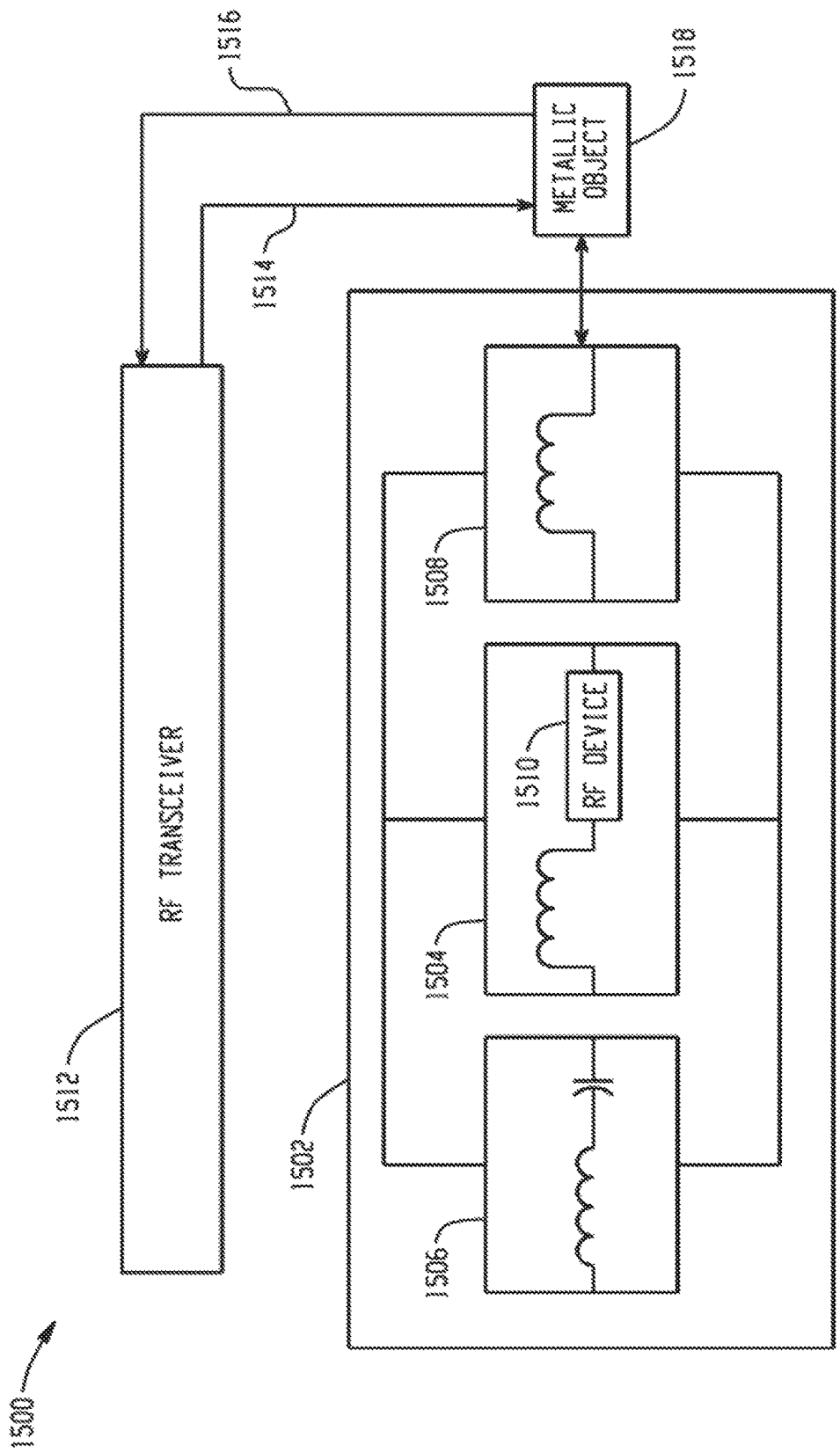
FIG. 15 depicts a system for determining a location of a metallic object.

FIG. 15 depicts a system for determining a location of a metallic object. The system includes an antenna coupler mechanism 1502, which includes a first tuning leg 1504, a second tuning 1506, and a bottom plate 1508. The first tuning leg 1504 includes a radio frequency device 1510. The system also includes a radio frequency transceiver 1512 configured to send an interrogation signal 1514 to the radio frequency device 1510 and to receive a response signal 1516 originating from the radio frequency device 1510. The system further includes a metallic object 1518 connected to the antenna coupler mechanism 1502. The metallic object 1518 is configured to receive the response signal 1516 via the bottom plate 1508 and to transmit the response signal 1516 to the radio frequency transceiver 1512.

In this disclosure, the term "RF device" is meant to refer to any element involving radio frequency electronics, generally. Thus, the term "RF device" encompasses RF integrated circuits, RFID integrated circuits, RFID tags, and other RF transceivers and transponders. The RF device may or may not include an internal antenna element.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A tagged surgical tool comprising:
    a metallic surgical tool having a length;
    an antenna coupler mechanism coupled to the metallic surgical tool, the antenna coupler mechanism comprising:
        a first tuning leg comprising a first inductive circuit element, the first tuning leg being configured to accept a radio frequency device in series with the first inductive circuit element;
        a second tuning leg comprising a second inductive circuit element and a capacitive circuit element connected in series, the second tuning leg being connected electrically in parallel with the first tuning leg; and
        a bottom plate comprising a third inductive circuit element connected electrically in parallel with the first tuning leg and connected electrically in parallel with the second tuning leg, the bottom plate being configured to couple energy into the metallic surgical tool; and
    a RF device coupled to the antenna coupler mechanism and having an operating wavelength that is approximately twice the length of the metallic surgical tool;
    wherein the antenna coupler mechanism defines an interface between the metallic surgical tool and the RF device, and the antenna coupler mechanism is conducive to energy coupling between the RF device and the metallic surgical tool.

2. A tagged surgical tool, comprising:
    a metallic surgical tool having a length; and
    an antenna coupler mechanism coupled to the metallic surgical tool, said antenna coupler mechanism comprising:
        a first tuning leg comprising a first inductive circuit element, the first tuning leg being configured to accept a radio frequency device in series with the first inductive circuit element;
        a second tuning leg comprising a second inductive circuit element and a capacitive circuit element connected in series, the second tuning leg being connected electrically in parallel with the first tuning leg; and
        a bottom plate comprising a third inductive circuit element connected electrically in parallel with the first tuning leg and connected electrically in parallel with the second tuning leg, the bottom plate being configured to couple energy into the metallic surgical tool; and
    a RF device coupled to the antenna coupler mechanism and having an operating wavelength,
        wherein the length of the metallic surgical tool is less than the operating wavelength of the RF device.

3. The tagged surgical tool of claim 2, wherein the bottom plate and the metallic surgical tool having a volume of air therebetween.

4. The tagged surgical tool of claim 2, wherein the first tuning leg, the second tuning leg, and the bottom plate are stacked vertically from the surface of the metallic surgical tool.

5. A surgical tool comprising:
    a metallic surgical tool;
    an antenna coupler mechanism coupled to the metallic surgical tool, the antenna coupler mechanism comprising:
        a first tuning leg comprising a first inductive circuit element, the first tuning leg being configured to accept a radio frequency device in series with the first inductive circuit element;
        a second tuning leg comprising a second inductive circuit element and a capacitive circuit element connected in series, the second tuning leg being connected electrically in parallel with the first tuning leg; and
        a bottom plate comprising a third inductive circuit element connected electrically in parallel with the first tuning leg and connected electrically in parallel with the second tuning leg, the bottom plate being configured to couple energy into a metallic surgical tool;
    wherein an impedance value of the antenna coupler mechanism matches an impedance value of the metallic surgical tool.

* * * * *